T. E. McDonald,
Wringer Roll.
No. 113,544. Patented Apr. 11, 1871.

Witnesses:
Wm. H. C. Smith.
Alex. F. Roberts.

Inventor:
Thomas E. McDonald.
Per Munn & Co
Attorneys.

United States Patent Office.

THOMAS E. McDONALD, OF TRENTON, NEW JERSEY.

Letters Patent No. 113,544, dated April 11, 1871.

IMPROVEMENT IN SPINDLES FOR WRINGER-ROLLERS.

The Schedule referred to in these Letters Patent and making part of the same.

To all whom it may concern:

Be it known that I, THOMAS E. McDONALD, of Trenton, in the county of Mercer and State of New Jersey, have invented a new and useful Improvement in Dovetailed Spindle for Wringer-Rollers; and I do hereby declare that the following is a full, clear, and exact description thereof, which will enable others skilled in the art to make and use the same, reference being had to the accompanying drawing forming part of this specification.

The present invention relates to a new and improved spindle for wringer-rollers, the nature of which consists in dovetailing the spindle longitudinally, so that the rubber, when rolled over the same, may be pressed into the said dovetailed grooves and thereby serve to lock and hold the rubber roller to its spindle, the construction of which will be fully understood from the following description.

Similar letters of reference indicate corresponding parts.

Figure 1:
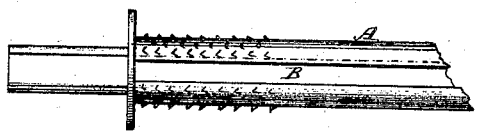
Figure 1 represents a side view of a portion of the spindle for a wringer-roller.
Figure 2:
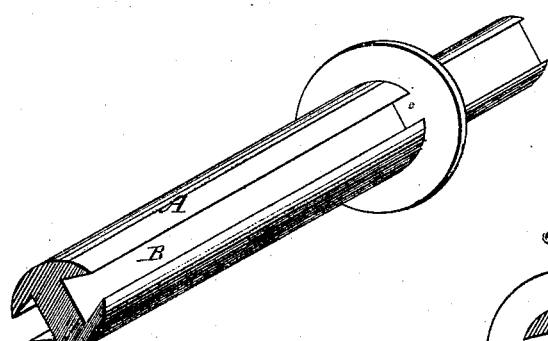
Figure 2 is a perspective view of the same.
Figure 3:
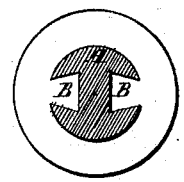
Figure 3 is a cross-section through the line $y\,y$.

In the case here presented the letter A represents the spindle, which has two or more dovetailed grooves, B, cut or cast its entire length, as shown in the accompanying drawing, so as to receive the rubber or other similar substance as it is rolled over the same; and being thus pressed in the said grooves it will there serve as a key to lock the same fast to the spindle so that it cannot shake loose from constant use and straining.

In addition to the above-described grooves I also propose having the entire surface of the spindle rasped or roughened, as shown, so as to make the rubber adhere or cling more tenaciously to the spindle.

It will thus be seen that by using this spindle I am enabled to dispense with the use of wire and fabric to give body and stiffness to the rollers as constructed at present, thereby forming a cheaper and more durable article of manufacture.

Having thus described my invention,

I claim as new and desire to secure by Letters Patent—

A spindle for rubber wringer-rollers, constructed with dovetailed grooves cut or cast longitudinally in the manner and for the purpose substantially as herein set forth, shown, and described.

The above specification of my invention signed by me this 3d day of March, 1871.

THOMAS E. McDONALD.

Witnesses:
GEO. W. MABEE,
EDGAR TATE.